United States Patent [19]

Konotsune et al.

[11] Patent Number: 4,585,834

[45] Date of Patent: Apr. 29, 1986

[54] SILICON-CONTAINING STEP LADDER POLYMER AND A PROCESS FOR PRODUCING THE SAME

[75] Inventors: Shiro Konotsune, Yokosukashi; Hiromi Higashi, Zushishi; Masami Wada, Yokosukashi; Hiroshi Maehara, Yokohamashi; Kazuyuki Tsuji, Tokyo, all of Japan

[73] Assignee: Chisso Corporation, Osaka, Japan

[21] Appl. No.: 758,367

[22] Filed: Jul. 24, 1985

Related U.S. Application Data

[62] Division of Ser. No. 651,689, Sep. 18, 1984.

[51] Int. Cl.$^4$ .............................................. C08F 8/40
[52] U.S. Cl. ................................ 525/342; 525/326.5; 525/386
[58] Field of Search .............................. 525/342, 386

[56] References Cited

U.S. PATENT DOCUMENTS

| | | | |
|---|---|---|---|
| 3,125,554 | 3/1964 | Cooper et al. | 525/326.5 |
| 3,764,589 | 10/1973 | Bond, Jr. et al. | 525/326.5 |
| 4,254,248 | 3/1981 | Friends et al. | 526/279 |
| 4,260,725 | 4/1981 | Keogh et al. | 526/279 |
| 4,297,310 | 10/1981 | Akotsu et al. | 525/326.5 |
| 4,303,772 | 12/1981 | Novicky | 526/279 |
| 4,412,042 | 10/1983 | Matsuura et al. | 525/326.5 |
| 4,478,990 | 10/1984 | Kohuo et al. | 526/279 |

Primary Examiner—Joseph L. Schofer
Assistant Examiner—Bernard Lipman
Attorney, Agent, or Firm—Fred Philpitt

[57] ABSTRACT

A silicon-containing step ladder polymer comprising a unit represented by the following general formula (I):

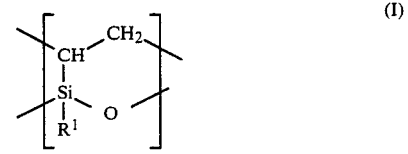

a unit represented by the following general formula (II):

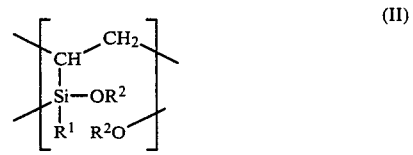

and a unit represented by the following general formula (III):

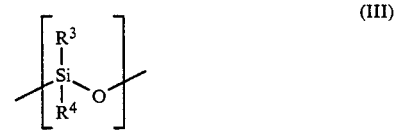

where $R^1$ represents a hydrocarbon or fluorine-substituted hydrocarbon group, $R^2$ represents hydrogen or a trialkyl siloxy group, and $R^3$ and $R^4$ which may be identical or different with each other represent individually hydrocarbon or fluorine-substituted hydrocarbon groups, the molar ratio of the unit (I) to the unit (II) is between 5:1–100:1 and the molar ratio of the unit (III) to the total amount of the unit (I)+unit (II) is between 1:5–1:100, as well as a process for producing such polymer.

32 Claims, 1 Drawing Figure

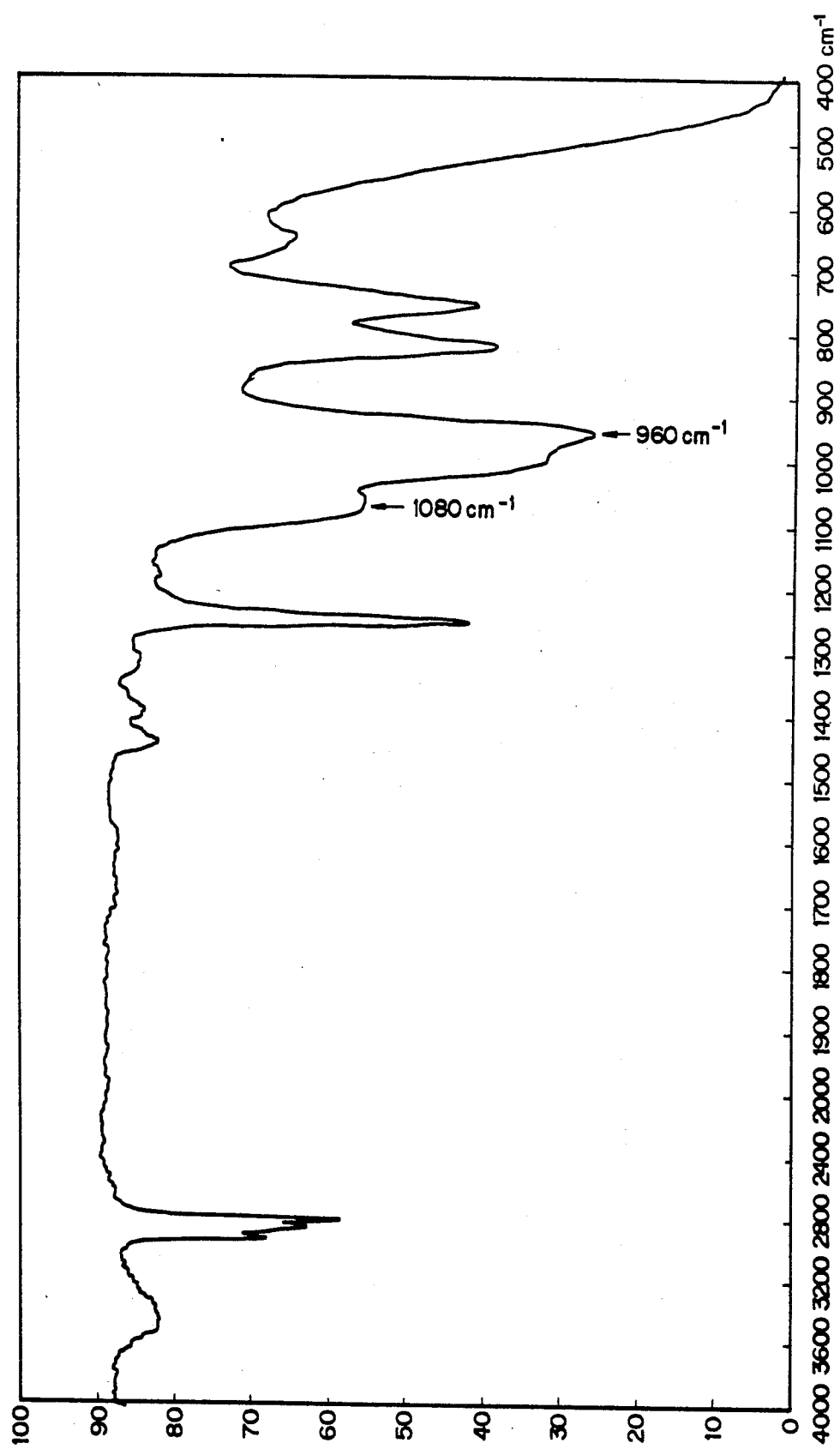

SILICON-CONTAINING STEP LADDER POLYMER AND A PROCESS FOR PRODUCING THE SAME

This is a division of application Ser. No. 651,689, filed Sept. 18, 1984 and the benefits of 35 USC 120 are claimed relative to it.

BACKGROUND OF THE INVENTION

1. Field of the Invention

This invention concerns a novel silicon-containing polymer. More specifically, it relates to a silicon-containing polymer useful as electronic materials having excellent performances such as high heat resistance, film-forming property and transparency.

2. Description of the Prior Art

Silica, polyimide and the like have hitherto been employed as heat-resistant insulating materials in the field of electronic materials but they are not always safisfactory in view of the workability and the performance. Then, the present inventors have noted to heat-resistant insulation oils mainly composed of polysiloxane and siloxane bond-containing polymers having heat resistant insulating performance as found in silica ($SiO_2$). Referring to the properties of these polymers, however, the former is a oily or low melting material and can not easily be used as the solid heat resistant insulating material. While on the other hand, the latter has to rely on the chemical vapor deposition (CVD) process for the formation of insulating films, which is carried out through gas phase reaction and, therefore, provides poor productivity.

Then, we have noted to ladder polymers containing siloxane bonds in order to solve the foregoing problems. It is known that the ladder polymer is one of the means for improving the solubility and heat the resistance of polymers.

While a siloxane bond-containing ladder polymer having the general formula:

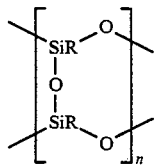

has been reported as the siloxane ladder polymer (refer to Japanese Patent Laid-Open No. 49540/1981), since the polymer is difficult to synthesize and the coating film resulted therefrom tends to cause cracking and it has not yet been put to practical use.

A siloxane-containing ladder polymer having the general formula:

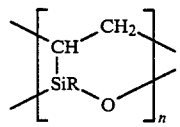

has also been reported (U.S. Pat. No. 3485857), but it involve a problem of having a low molecular weight and thus readily causing crackings in the coated film.

The object of this invention is to overcome the foregoing defects in the silicon-containing ladder polymers in the prior art and provide a novel silicon-containing polymer having solvent solubility and excellent in the heat resistant insulating property and film-forming property.

SUMMARY OF THE INVENTION

This invention concerns a silicon-containing step ladder polymer comprising a unit represented by the following general formula (I):

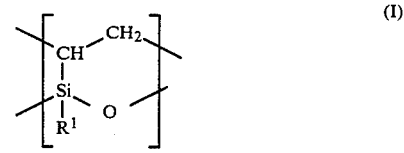

a unit represented by the following general formula (II):

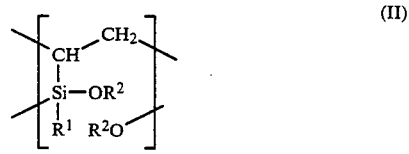

and a unit represented by the following general formula (III):

where $R^1$ represents a hydrocarbon of fluorine-substituted hydrocarbon group, $R^2$ represents hydrogen or a trialkyl siloxy group, and $R^3$ and $R^4$ which may be identical or different with each other represent individually hydrocarbon or fluorine-substituted hydrocarbon groups, the molar ratio of the unit (I) to the unit (II) is between 5:1-100:1 and the molar ratio of the unit (III) to the total amount of the unit (I)+unit (II) is between 1:5-1:100, as well as process for producing such polymer.

BRIEF DESCRIPTION OF THE DRAWINGS

The FIGURE is an infrared absorption spectrum chart of the silicon-containing step ladder polymer prepared in Example 1.

DETAILED DESCRIPTION OF THE INVENTION AND THE PREFERRED EMBODIMENTS

In the above-formulas, $R^1$ preferably has 1-10 carbon atoms. More preferably, $R^1$ is an alkyl or fluorine-substituted alkyl having 1-4 carbon atoms or phenyl group. As the number of carbon atoms in $R^1$ increases, the heat-resistance of the silicon-containing step ladder polymer of this invention is reduced and steric hindrance undesirably is resulted in the synthetic reaction of the polymer. In the case of the aromatic hydrocarbon group such as phenyl group, however, the effect of reducing the heat resistance is not so remarkable.

The alkyl moiety in $R^2$, in case it is a trialkyl silyl group, has preferably 1-10 and, more preferably, 1-4 carbon atoms. As the number of the carbon atoms in the alkyl group increases, the reaction rate of the trialkyl silylation for the silanol group (Si—OH) in the synthetic reaction of the silicon-containing step ladder polymer of this invention is decreased and the heat-resistant property of the polymer is also reduced.

$R^3$ and $R^4$ mentioned above have carbon, preferably, 1-10 carbon atoms. More preferably, $R^3$ and $R^4$ are alkyl or fluorine-substituted alkyl groups having 1-4 carbon atoms or phenyl groups. As the number of carbon atoms in $R^3$ and $R^4$ increases, the heat resistance of the silicon-containing step ladder polymer of this invention is reduced and the steric hindrance is undesirably resulted in the synthetic reaction of the polymer. In the case of the aromatic hydrocarbon group such as phenyl group, however, the tendency of reducing the heat resistance is not so remarkable.

If the ratio of unit I/unit II is less than 5, the heat resistance of the silicon-containing step ladder polymer of this invention is undesirably lowered. While on the other hand, if the ratio exceeds 100, the bonding function of the step ladder polymer of this invention is reduced.

If the molar ratio of the total amount of the unit I and the unit II to the unit III is less than 5, the heat resistance of the silicon-containing step ladder polymer of this invention is reduced. While on the other hand, if the ratio is in excess of 100, it becomes difficult to synthesize the step ladder polymer.

The unit chain of the ladder structure composed of the units selected from the unit I and unit II preferably comprises 5-100 of the units I and II. If it is less than 5, the heat resistance of the silicon-containing step ladder polymer of this invention is reduced and, while on the other hand, if it exceeds 100, it is difficult to synthesize the chain.

It is preferred that the step ladder polymer of this invention comprises the unit chains as described above, which are bonded through the unit (III) or its chains composed of 5 of less into a higher molecule. The shorter chain length of the unit III is better. If it exceeds 5, the heat resistance of the step ladder polymer of this invention is undesirably reduced.

The molecular weight of the step ladder polymer according to this invention as the weight average molecular weight measured by the GPC (gel permeation chromatography) is, preferably, between $3.0 \times 10^3$–$6.5 \times 10^5$. If the molecular weight is less than $3.0 \times 10^3$, the film of the step ladder polymer of this invention easily undergoes cracking and, while on the other hand, if it exceeds $6.5 \times 10^5$, the film forming property is reduced and the workability is worsened. It is preferred that the molecular weight distribution (weight average molecular weight/number average molecular weight) of the step ladder polymer of this invention is preferably more than 2.5. If it is less than 2.5, the film forming property of the step ladder polymer of this invention is poor to readily induce crackings.

The silicon-containing step ladder polymer according to this invention shows an infrared absorption spectrum inherent to the 1,5-disilpyran ring chain at the wave number of 960 cm$^{-1}$. The polymer also exhibits the infrared absorption spectrum inherent to the siloxane bond in the unit (III) at the wave number region between 1020-1090 cm$^{-1}$. The absorption ratio between the wave number 960 cm$^{-1}$ and the wave number 1080 cm$^{-1}$ (A1080/A960) is preferably between 0.05-0.3. If the absorption ratio is less than 0.05, degree of polymerization due to the unit (III) is insufficient and, while on the other hand, if it is in excess of 0.3, the component of the ladder structure is decreased to undesirably reduce the heat-resistance of the step ladder polymer of this invention.

In the unit (I), the free CH bond is usually bonded to the free CH$_2$ bond in other unit (I), the free CH$_2$ bond in the unit (II), a residual hydrocarbon group of a polymerization initiator or hydrogen; the free Si bond is usually bonded to the free O bond in other unit (I), the free $R^2O$ bond in the unit (II), the free O bond of the unit (III) or the independent $R^2O$; the free CH$_2$ bond is usually bonded to the free CH bond in other unit (I), the free CH bond in the unit (II), a residual hydrocarbon group of a vinyl polymerization initiator or hydrogen; and the free O bond is usually bonded to the free Si bond of the other unit (I), the free Si bond of the unit (II), the free Si bond in the unit (III) or $R^2$.

In the unit (II), the free CH bond is usually bonded to the free CH$_2$ bond in the unit (I); the free Si bond is usually bonded to the free O bond in the unit (I); and the free CH$_2$ bond is usually bonded to the free CH bond in the unit (I); and the free $R^2O$ bond is usually bonded to the free Si bond in the unit (I).

In the unit (III), the free Si bond is usually bonded to the free O bond in the unit (I), the free O bond in other unit (III) or independent $R^2O$—; the free O bond is usually bonded to the free Si bond in the unit (I), the free Si bond in other unit (III) or independent $R^2$.

Accordingly, the silicon-containing step ladder polymer of this invention typically has the following structure:

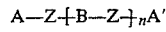

where A has the following structure:

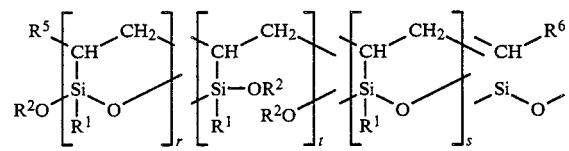

where $R^5$ and $R^6$ individually represent hydrogen or hydrocarbon residue of the vinyl polymerization initiator provided that if one of them is hydrogen the other is the hydrocarbon residue; $r \geq 1$, $s \geq 1$, $r+s+t=4$–$99$, t is an integer and $t/(r+s)=0.01$–$0.2$.

A' has the following structure:

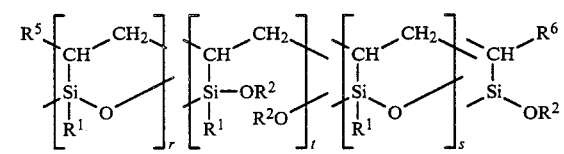

where $R^5$, $R^6$, r, t and s have the same meanings as above.

B has the following structure:

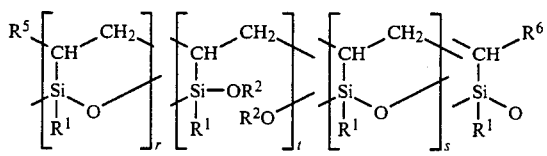

where $R^5$, $R^6$, r, t and s have the same meanings as above.

Z has the following structure:

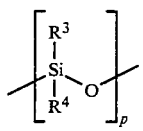

where P is an integer from 1 to 5.

n is a number of about 0–1300.

While the above-mentioned structure is one of the typical example, the structure B may substitute, in some instance the structure Z particularly if B is a short chain with the degree of polymerization of 6 or less. Further, there may be a case two successive structures B are connected by way of the structure Z to other structure B.

The term "step" ladder polymer in the present invention is derived from the fact that the unit chain A, A' and B mainly composed of the ladder structure formed by the repeating units (I) are connected by way of $—O—SiR^3R^4—O—$ or $—O—$ as the step.

In preparing the silicon-containing step ladder polymer according to this invention, a vinyl silane derivative represented by the general formula: $CH_2=CHSiR^1X_2$ (where $R^1$ has the same meaning as above and X represents a dialkylamino group comprising alkyls each having 4 or less carbon atoms, chlorine, bromine, iodine, an alkoxy group with 7 or less carbon atoms or a thioalkoxy group with 7 or less carbon atoms) is at first subjected to vinyl polymerization by the use of a catalyst to prepare a polyvinyl silane prepolymer represented by the general formula:

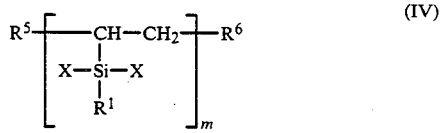

where $R^1$ and X have the same meanings as above, $R^5$ and $R^6$ individually represent hydrogen or the hydrocarbon residue of the polymerization initiator and m is an integer between 5–100.

For the vinyl polymerization of the vinyl silane derivative: $CH_2=CHR^1X_2$, radical polymerization or ionic polymerization is selected depending on the type of the substituent X. For instance, in the case where X is a dialkylamino group, anionic polymerization using an organic metal such as alkyl lithium and alkyl aluminum as the catalyst is possible and, in the case where X is an alkoxy group, halogen or thioalkoxy group, radial polymerization using a radial polymerization catalyst, for example, azonitrile such as azobisbutyronitrile, peroxides such as benzoyl peroxide and lauroyl peroxide and like other dicarbonate catalysts is possible.

The anionic polymerization for the vinyl silane derivative in which X is a dialkylamino group is carried out in an aliphatic hydrocarbon such as n-hexane, n-heptane and n-octane or an aromatic hydrocarbon such as benzene, toluene and xylene by adding a catalyst such as n-butyl lithium in n-hexane solution or diethyl aluminum chloride in n-hexane solution in a required amount at a relatively low temperature. The polymerization temperature employed is usually between −10°–90° C. and, preferably, between −5°–50° C.

The radical polymerization for the vinylsilane derivatives, in which X is halogen, alkoxy or thioalkoxy group, can be carried out in a hydrocarbon solvent such as toluene and xylene or with no such solvent, by the use of the above mentioned radical polymerization catalyst and at a temperature usually between 50°–200° C. and, preferably, between 80°–150° C.

The method of the vinyl polymerization per se have already been reported in many literatures, which can be applied to the vinyl polymerization in this invention with no particular restriction to the above-mentioned processes.

Then, the vinyl polymer (prepolymer) is formed into a step ladder polymer.

As one of such processes, in the case where X in the vinyl polymer (IV) is an alkylamino group, chlorine, bromine or iodine, the functional group X is previously substituted with an acyloxy group represented by $R^7COO—$ ($R^7$ represents an alkyl having 4 or less carbon atoms) and then a stoichiometrical amount of water (relative to Si) is used to perform intramolecular hydrolytic condensation of the prepolymer and hydrolytic condensation between the prepolymer and the stepping agent represented by the general formula $R^3R^4Si(OCOR^7)_2$ (where $R^3$, $R^4$ and $R^7$ have the same meanings as above).

In the case where the functional group X of the prepolymer is a dialkylamino group, the acyloxylation for the prepolymer (IV) is carried out by reacting the polymer with an organic acid represented by the general formula $R^7COOH$ (where $R^7$ has the same meanings as above) in an inert aromatic hydrocarbon solvent such as benzene, toluene and xylene. The temperature usuable for the reaction is between −5°–70° C. and, preferably, 10°–50° C. The amount of the acid usable in the reaction is between 3–5 mol and, preferably, 4–4.5 mol based on Si in the prepolymer.

In the case where the functional group X of the prepolymer is halogen, the acyloxylation is carried out by adding an acid hydride represented by the general formula: $(R^7CO)_2O$ (where $R^7$ has the same meanings as above) to the polymer in an inert aromatic hydrocarbon solvent such as benzene, toluene and xylene while distilling off the resulting organic acid halogenoid. The temperature usable for the reaction is between 20°–150° C. and, preferably, 40°–120° C. The amount of the acid anhydride usable in the reaction is between 1.5–2.5 mol and, preferably, 2–2.3 mol based on Si of the prepolymer.

Hydrolytic condensation is carried out for the acyloxylated prepolymer in an inert aromatic hydrocarbon solvent such as benzene, toluene and xylene at a relatively low polymer concentration, for example, between 1–30% by weight and, preferably, 3–15% by weight with an object of preferentially forming the aimed ladder structure (repeating structure of the unit (I)). In order to obtain the step lader polymer according to this invention, the hydrolytic condensation is carried out either by the process of (1) subjecting the acyloxylated prepolymer to the hydrolytic condensation under the coexistence of the stepping agent $R^3R^4Si(OCOR^7)$ or (2) applying intra-molecular hydrolytic condensation to the prepolymer and, thereafter, adding the stepping agent: $R^3R^4Si(OCOR^7)$. In either of the methods, the hydrolytic condensation can be carried out by adding equimolar-100 malar amount of water to Si relevant to the reaction. The amount of water to be added is preferably between equimolar-10 molar and, more preferably, equimolar-3 molar amount based on Si in order to proceed the reaction moderately and preferentially form the aimed ladder structure. It is desired that the water is gradually dropped to react with or without the presence of an adequate catalyst. The adequate catalyst usable herein can include, for instance, inorganic acid such as hydrochloric acid and sulfuric acid, organic acid such as acetic acid and base such as sodium hydroxide and amine. The hydrolytic condensation is carried out at a relatively moderate condition, for example, at a temperature between $-5°-80°$ C. and, preferably, $20°-60°$ C.

As another method of converting the vinyl polymer (prepolymer) into the step ladder polymer, in the case where the functional group X in the vinyl polymer (IV) is an alkoxy group or a thioalkoxy group as described above, the vinyl polymer is brought into reaction with an acid anhydride represented by the general formula; $(R^7CO)_2O$ under the presence of a compound as the stepping agent represented by the formula: $R^3R^4SiY_2$ (where $R^3$ and $R^4$ have the same meanings as above and Y represents an acyloxy group with 2-5 carbon atoms, an alkoxy group with 1-4 carbon atoms or a thioalkoxy group with 1-4 carbon atoms.)

In this case, the reaction temperature can be between $30°-70°$ C. and, preferably, $50°-130°$ C. and, more preferably, $50°-90°$ C. under a reduced pressure of 50-200 mmHg. Desirably, the amount of the acid anhydride usable herein is 1-3 molar amount and, preferably, 1.2-2 molar amount based on Si of the vinyl polymer and the stepping agent (where Y represents an alkoxy group or a thioalkoxy group).

It is preferred to carry out the reaction while distilling off the ester resulting during the reaction.

In the course of the above reaction, the functional group X of the vinyl polymer is partially substituted with the acyloxy group which is then brought into deesterifying reaction with the non-substituted alkoxy group or the like to form at least a considerable portion of the aimed ladder structure already in this stage. The hydrolysis or hydrolytic condensation and hydrolysis may be carried out by adding water after the above-mentioned reaction, and it serves as the auxiliary reaction to stabilize the polymer by removing the residual acyl group in the resultant polymer or as the reaction to complete the aimed ladder structure and for the stabilization of the polymer. The hydrolysis or hydrolytic condensation can be carried out at a relatively moderate condition, for example, between $-5°-80°$ C. and, preferably, $20°-60°$ C. The amount of water to be added is preferably less than equimolar amount based on Si of the vinyl polymer. If the amount of water is excessive, it may cause undesirable crosslinking in the polymer.

In either of the processes for converting the prepolymer into the step ladder polymer, the hydrolytic condensation employed therein may be carried out at a relatively low temperature as described above, but the resultant reaction solution may be heated to a temperature between $50°-150°$ C. and, preferably, $70°-120°$ C. and aged for 0.5-5 hours with an aim of promoting the reaction and increasing the degree of polymerization.

The silicon-containing step ladder polymer thus synthesized contains a small amount of silanol groups (Si—OH) derived from the steric structure of the polymer and the reaction conditions. Consequently, crosslinking may some time occur between the polymer chains to cause gelation in the case where the polymer solution is concentrated or stored for a long period of time. In order to suppress such an undesired phenomenon and stabilize the resultant polymer, a silylating agent such as hexaalkylsilazane represented by the general formula: $R^8_3Si—NH—SiR^8_3$ or a trialkyl acyloxysilane represented by the general formula: $R^8_3—Si—OCOR^9$ (where $R^8$ represents an alkyl group with 1-10 carbon atoms and $R^9$ represents an alkyl group with 1-4 carbon atoms) can be added to react. The hydroxy group in the silanol group is substituted with the trialkyl siloxy group through the reaction to stabilize the polymer. The silylating reaction itself is well known generally in the reaction of polysiloxanes or organic silicon compounds, which can be applied to this invention with no particular restriction.

One of the application uses of the silicon-containing step ladder polymer according to this invention includes insulating varnish for use in electronic materials and since bonding performance is required therefor, the presence of some silanol group (SiOH) is desired. In this case, it is preferred to control the conditions for the stabilizing reaction depending on purposes so that the silanol content in the resultant polymer is adjusted between 0.0005-0.25 expressed as the molar ratio of (OH):(Si).

The polymer according to this invention is soluble in various solvents including aliphatic hydrocarbons such as n-hexane and n-heptan, aromatic hydrocarbons such as benzene and toluene and esters such as propyl acetate and ethyl acetate, and the solvent can be selected depending on the purpose of application use.

Referring then to the properties and the application uses of the polymer according to this invention, the polymer is easily soluble to the solvent and has desirable film-forming properties as described above. Further, the heat-curing temperature for the coated film may be between $150°-200°$ C. and crackings are not developed in the coating film. The polymer also exhibit a satisfactory heat resistance that the starting point for the heat decomposition is at $300°$ C. and the weight reduction when heated to $490°$ C. is less than 15%. Furthermore, the polymer is colorless. The above-mentioned properties of the polymer exhibits that it has a superiority to those polyimide resins which are typical examples of the heat resistant insulating polymer employed generally, in view of the workability (productibility) and the performance. Due to the above-mentioned superiority, the polymer according to this invention can be used broadly as chemical materials for electrical and electronic components such as liquid crystal orientation membrane in liquid crystal display cells, insulating protection films for color filters and coating material for electric wires.

This invention will now be described more specifically referring to examples.

EXAMPLE 1

(1) Synthesis of prepolymer

To a 300 ml volume three necked flask substituted with nitrogen, were charged 50 g of methyl vinyl bis-(dimethylamino)silane and 80 ml of n-hexane. Then, 11 mmol of n-butyl lithium in an n-hexane solution were added to carry out polymerization under stirring. After carrying out the polymerizing reaction at a temperature of 40° C. for 3 hours, the reaction solution was dropped in methanol to precipitate the polymer. The polymer was washed and filtered repeatedly for 3–4 times using methanol and then dried under vacuum. The polymer was obtained in an amount of 23.3 g and had an average degree of polymerization of 12.5 based on the molecular weight measurement according to the gel permeation chromatography.

(2) Synthesis of step ladder polymer

In a 500 ml volume three necked flask substituted with nitrogen, 20 g of the prepolymer obtained in the step (1) above were charged and dissolved in 300 ml of toluene. After dissolving, 30 ml of glacial acetic acid were added dropwise to react under a nitrogen stream while stirring at room temperature. After one hour reaction, 1.5 g of dimethyl diacetoxysilane were added and the stirring was continued for 15 min and then 2.5 ml of water were added dropwise to react for 10 min and the reaction was continued for one hour while stirring at room temperature. After the reaction was completed, the resultant solution was transferred to a separating funnel and 200 ml of diethyl ether were added. Then, water was added for washing through shaking to separate the aqueous layer. After repeating the water washing procedure for three times, the organic layer was separated, incorporated with anhydrous potassium carbonate and dried over one night. After filtering out potassium carbonate, the solution was transferred to a flask and heated in a warm water bath to distill off the ether. The residual solution was heated to 75°–80° C. to distill off toluene under a reduced pressure and concentrate the solution, till a polymer solution of about 10% concentration was resulted. A portion of the solution was collected as a sample, which was subjected to the infrared absorption spectroscopy and molecular weight measurement according to the GPC method. The infrared absorption spectroscopy was carried out by coating the solution on a KBr plate and after drying it at 70° C. As shown in FIGURE for the absorption spectrum thus obtained, the characteristic absorption spectrum of the siloxane bond constituting the ladder structure (the repeating structure of unit (I)) was indicated at 960 cm$^{-1}$ and that of the siloxane bond constituting the step bond (unit (III)) was indicated at 1020 cm$^{-1}$ and 1080 cm$^{-1}$. The absorption ratio of the spectrum, i.e., A1080/A960 was 0.1. As the result of the molecular weight measurement, it was found that the weight average molecular weight was $1.7 \times 10^4$ and a step ladder polymer comprising 15 sagment of the prepolymer hydrolytic condensates was formed. Further, the presence of the silanol group (Si—OH) was observed as the result of the infrared absorption spectroscopy, the amount of the silanol group as expressed in the (OH)/(si) ratio was 0.1 by the analysis according to G. E. Kellum, et al. (Anal. Chem. 39, 1623 (1967)).

EXAMPLE 2

(1) Synthesis of prepolymer

Polymerization was carried out in the same procedures as in Example 1 excepting that the amount of the n-butyl lithium catalyst used was changed to 10 mmol and 23 mmol respectively to obtain two kinds of polymer having different polymerization degrees. The average polymerization degrees for the polymers were 13.9 and 6.6 respectively based on the GPC measurement.

(2) Synthesis of step ladder polymer

A ladder polymer was synthesized in the same procedures as in Example 1 excepting for using 15 g of the prepolymer with polymerization degree 13.9 and 5 g of the polymer with the polymerization degree 6.6 obtained in the step (1) above and changing the amount of diethyl diacetoxysilane used therein to 2.0 g. As the result of the measurement, the weight average molecular weight was $2.5 \times 10^4$ and the absorption ratio in the infrared absorption spectrums (A1080/A960) was 0.12.

COMPARATIVE EXAMPLE 1

(1) Synthesis of prepolymer

Polymerization was carried out under the same conditions as in Example 1. The average polymerization degree of the resultant prepolymer was 11.8.

(2) Synthesis of ladder polymer

The synthetic reaction was carried out using the same apparatus and under the same conditions as those in Example 1 by dissolving 15 g of the prepolymer obtained in the step (1) above into 230 ml of toluene. 22 ml of glacial acetic acid were added dropwise and reacted for one hour, followed by dropping to react 1.7 ml of water. After dropping was completed, the reaction was continued under stirring for one hour. Water washing, drying and concentration were carried out in the same procedures as Example 1. From the result of the analysis, it was found that the weight average molecular weight was $1.4 \times 10^3$ and the absorption ratio in the infrared absorption spectrums (A1080/A960) was 0.08. The (OH)/(Si) ratio was 0.28.

COMPARATIVE EXAMPLE 2

(1) Synthesis of prepolymer

To a nitrogen-substituted flask, were charged 15.0 g of methyl vinyl diethoxysilane and 0.05 g of azobisisobutyronitrile were further added as the radical polymerization initiator and polymerization was carried out in an oil bath at 140°–150° C. under a nitrogen gas stream for 6 hours. After the polymerization was completed, unreacted monomer was distilled off through distillation to obtain 13.4 g of polymer. The average polymerization degree was 11.2.

(2) Synthesis of step ladder polymer

To 10.0 g of the prepolymer as prepared in the step (1) above, were added 150 ml of toluene and 0.5 g of methyl diethoxysilane, which were transferred to a 300 ml volume three necked flask. 1.2 ml of an aqueous 1N hydrochloric acid solution were added and reacted under stirring at 50° C. for 3 hours. After washing and separating the reaction solution repeatedly for three times, the toluene layer was separated and dried with anhydrous potassium carbonate. The toluene solution was heated to 70° C. under a reduced pressure to distill off toluene and concentrate the solution. As the result of the analysis for the resultant solution, it was found that the weight average molecular weight according to the GPC method was 2300, no change was recognized in the infrared absorption spectrum as compared with that of the prepolymer and no absorption spectrum was found at 960 cm$^{-1}$.

EXAMPLE 3

A step ladder polymer was synthesized under the same conditions as in Example 1. The resultant polymer had a weight average molecular weight of $1.6 \times 10^4$ and the (OH)/(Si) ratio of 0.12. The polymer solution was concentrated by distilling off toluene into a 8 w% solution. To 100 ml of the solution, were added 0.8 g of hexamethyl disilazane (hereinafter referred to simply as HMDS) and reacted at 90° C. under stirring for one hour. After the reaction was over, toluene was distilled off at 80° C. under a reduced pressure to 12 w% by concentration. The resulted step ladder polymer had the weight average molecular weight of $2.9 \times 10^4$ and the (OH)/(Si) ratio of 0.002 as the result of the analysis.

EXAMPLE 4

(1) Synthesis of prepolymer

To a 200 ml volume three necked flask substituted with nitrogen, were charged 70 g of vinyl methyl diethoxysilane and 0.7 g of azobisisobutyronitrile and polymerization was carried out in a nitrogen gas stream at 130° C. under stirring for 10 hours. After the reaction was over, the unreacted monomer was distilled off under a reduced pressure to obtain 59.1 g of polymerizate.

The molecular weight of the resulted polymer was 4300 as the result of the GPC measurement.

(2) Synthesis of ladder polymer 50 g of prepolymer and 2.1 g of dimethyl diethoxysilane were dissolved in 800 ml of purified toluene and they were charged into a 2 litter volume three necked flask equipped with a distillator substituted with nitrogen. 50 g of unhydrous acetic acid were added to react in a nitrogen gas stream at 80° C. 20 min. after the start of the reaction, the pressure inside of the reaction vessel was reduced to 120 mmHg through the distillator and the reaction was continued for three hours while distilling off the resulted ethyl acetate. After the reaction was over, the reaction mixture was cooled to 30° C. and 4 ml of distilled water were added dropwise to react, which was continued for one hour. After the reaction was over, the reaction solution was transferred to a separation funnel and washed with water to separate the organic layer. After repeating the water-washing procedure for three times, the organic layer was dehydrated and dried with anhydrous potassium carbonate.

The dried organic layer was transferred to the distillator and toluene was distilled off at a temperature of 70° C. under a reduced pressure till the polymer solution was concentrated to 7%.

When measured by the GPC method, the thus obtained polymer had a weight average molecular weight of $3.5 \times 10^4$ and a molecular weight distribution was 5.7. Based on the infrared absorption spectrum of the polymer, absorption at 960 cm$^{-1}$ indicating the ladder structure was confirmed.

EXAMPLE 5

To a 200 ml of toluene solution containing 10 w% step ladder polymer prepared in the same manner as in Example 1, were added 3.0 g of trimethyl monoacetoxy silane and, after reaction at 50° C. for one hour, transferred to a separation funnel and subjected to water washing and separation for three times. After dewatering to dry the toluene layer with anhydrous potassium carbonate, toluene was distilled off at 70° C. under a reduced pressure to concentrate the solution and obtain 14 w% polymer solution.

As the result of the analysis, the amount of the silanol residue was 0.008 was expressed in the (OH)/(Si) ratio.

EXAMPLE 6

15 w% solutions of polymers prepared in Examples 1, 3 and Comparative Example 1, 2 were spin-coated on silicon waters (rpm—1000), and subjected to heat treatment at 170° C. for 30 min respectively. Then, the state of coated films and the electrical properties were examined. The heat resistance of the polymer was also measured. The results are shown in the table below.

| Polymer sample | Film state | | Withstand insulation (V/μm) | Decomposing point temperature (°C.) |
|---|---|---|---|---|
| | film thickness | crackings | | |
| Example 1 | 1.2μ | none | 250 | 298 |
| Example 3 | 1.5μ | none | 250 | 315 |
| Comparative Example 1 | 0.5μ | much | — | 290 |
| Comparative Example 2 | 1.0μ | none | 150 | 195 |

As the results above, it was confirmed that the silicon-containing step ladder polymer according to this invention had desirable properties as the heat resistant insulating film.

EXAMPLE 7

The same reaction as in Example 1 was carried out excepting for replacing methyl vinyl bis(dimethylamino)silane with 70 g of phenyl vinyl bis(dimethylamino)silane.

As the result of the analysis for the thus prepared step ladder polymer infrared absorption spectrum was observed at 960 cm$^{-1}$ and the absorption ratio thereof to the absorption at 1080 cm$^{-1}$: (A1080/A960) was 0.15. The weight average molecular weight was $2.1 \times 10^4$ and the molecular weight distribution was 3.7. The content of the silanol group (SiOH) was 0.12 as expressed in the (OH)/(Si) molar ratio.

EXAMPLE 8

The same reaction as in Example 1 was carried out except for replacing methyl vinyl bis(dimethylamino)silane with 65 g of trifluoropropyl vinyl bis(dimethylamino)silane.

As the result of the analysis for the thus prepared step lader polymer, infrared absorption spectrum was observed at 960 cm$^{-1}$ and the absorption ratio thereof to the absorption at 1080 cm$^{-1}$ (A1080/A960) was 0.10. The weight average molecular weight was $1.8 \times 10^4$ and the silanol group content was 0.15 as expressed in (OH)/(Si) molar ratio.

EXAMPLE 9

The same reaction as in Example 1 was carried out except for replacing dimethyl diacetoxysilane used in the step ladder reaction in Example 1 with 1.7 g of methyl phenyl diacetoxysilane.

As the result of the analysis for the thus prepared step ladder polymer, infrared absorption at 960 cm$^{-1}$ indicating the ladder structure was observed. As the result of the GPC molecular weight measurement, the weight average molecular weight was $2.0 \times 10^4$ and the molecular weight distribution was 2.7. The silanol group content was 0.14 as expressed in the (OH)/(Si) ratio.

What is claimed is:

1. A process for producing a silicon-containing step ladder polymer which comprises a step of substituting the group $X^1$ in a polyvinyl silane prepolymer represented by the general formula:

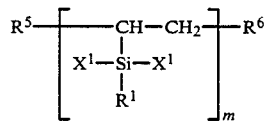

where $R^1$ represents a hydrocarbon group or fluorine-substituted hydrocarbon group, $X^1$ represents a dialkylamino group comprising alkyls each having 4 or less carbon atoms, chlorine, fluorine or iodine, $R^5$ and $R^6$ represent individually hydrogen or hydrocarbon residue of a vinyl polymerization initiator, and m represents an integer between 5–100, with an a acyloxy group represented by: $R^7$COO— (where $R^7$ represents an alkyl group having 4 or less carbon atoms), and a step of carrying out the intra-molecular hydrolysis of the prepolymer, as well as the hydrolytic condensation between the prepolymer and a stepping agent represented by the general formula: $R^3R^4Si(OCOR^7)_2$ (where $R^3$ and $R^4$ which may be identical or different with each other represent individually hydrocarbon group or fluorine-substituted hydrocarbon groups, and $R^7$ represent an alkyl group having 1–4 carbon atoms.

2. The process as defined in claim 1, wherein $R^1$ has 1–10 carbon atoms, $R^3$ and $R^4$ individually have 1–10 carbon atoms and the residue of the polymerization initiator has 2–18 carbon atoms.

3. The process as defined in claim 2, wherein $R^1$ represents an alkyl group having 1–4 carbon atoms, a fluorine-substituted alkyl group having 1–4 carbon atoms or a phenyl group; and $R^3$ and $R^4$ individually represent alkyl or fluorine-substituted alkyl groups having 1–4 carbon atoms or phenyl groups.

4. The process as defined in claim 3, wherein $R^1$ represents a methyl, trifluoropropyl or phenyl group and $R^3$ and $R^4$ represent individually methyl or phenyl groups.

5. The process as defined in claim 1, wherein $R^7$ represents a methyl group.

6. The process as defined in claim 1, wherein $X^1$ represents a dialkylamino group, and the acyloxylation is carried out by reacting the prepolymer with the addition of an organic acid represented by the general formula: $R^7$COOH ($R^7$ has the same meanings as above) in an inert aromatic hydrocarbon solvent.

7. The process as defined in claim 6, wherein the reaction is carried out at a temperature between $-5°$–$70°$ C. and, preferably, $10°$–$50°$ C.

8. The process as defined in claim 6, wherein the amount of the acid added is 3–5 molar times and, preferably, 4–4.5 molar times based on Si of the prepolymer.

9. The process as defined in claim 1, wherein $X^1$ represents chlorine, bromine or iodine and the acyloxylation is carried out by the addition of an acid anhydride represented by the general formula: $(R^7CO)_2O$ (Where $R^7$ has the same meanings as above) to the prepolymer in an inert hydrocarbon solvent.

10. The process as defined in claim 9, wherein the reaction is carried out at a temperature between $20°$–$150°$ C. and, preferably, $40°$–$120°$ C.

11. The process as defined in claim 9, wherein the amount of the acid anhydride added is between 1.5–2.5 molar times and, preferably, 2–2.3 molar times based on Si of the prepolymer.

12. The process as defined in claim 1, wherein the hydrolytic condensation for the acyloxylated prepolymer is carried out in an inert aromatic hydrocarbon solvent with the concentration of said acyloxylated prepolymer being at 1–30% by weight and, preferably, 3–15% by weight.

13. The process as defined in claim 1, wherein the hydrolytic precondensation is carried out by adding water in the range of equimolar–100 molar amount and, preferably, equimolar–10 molar amount and, more preferably, equimolar–3 molar amount based on Si relevant to the hydrolytic condensating reaction.

14. The process as defined in claim 13, wherein the hydrolysis is carried out under the presence of an acid or base.

15. The process as defined in claim 1, wherein the hydrolytic condensation is carried out at a temperature between $-5°$–$80°$ C. and, preferably, $20°$–$60°$ C.

16. The process for producing the silicon-containing step ladder polymer as defined in claim 1, wherein the acyloxylated prepolymer is hydrolized under the coexistence of the stepping agent $R^3R^4Si(OCOR^7)_2$.

17. The process for producing the silicon-containing step ladder polymer as defined in claim 1, wherein the intra-molecular hydrolytic condensation is carried out for the acyloxylated prepolymer and, thereafter, the stepping agent $R^3R^4Si(OCOR^7)$ is added to perform hydrolytic condensation.

18. The process as defined in claim 1, wherein after the completion of the reaction for the hydrolytic condensation, the reaction solution is heated to a temperature between $50°$–$150°$ C. and, preferably, $70°$–$120°$ C. for 0.5–5 hours.

19. The process as defined in claim 1, wherein after the hydrolytic condensation, hexaalkylsilazane of the general formula: $R^8{}_3Si$—NH—$SiR^8{}_3$ (where $R^8$ represents an alkyl having 1–10 carbon atoms) or a trialkyl acyloxysilane of the general formula $R^8{}_3Si$—OCOR$^9$ (where $R^8$ has the same meanings as above and $R^9$ represents an alkyl group having 1–4 carbon atoms) is added to the resultant polymer for reaction.

20. A process for producing a silicon-containing step ladder polymer, wherein a polyvinyl silane prepolymer represented by the general formula:

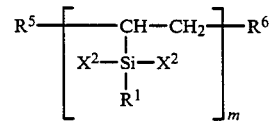

(where $R^1$ represents a hydrocarbon group or a fluorine-substituted hydrocarbon group, $X^2$ represents an alkoxy group having 7 or less carbon atoms or a thioalkoxy group having 7 or less carbon atoms, $R^5$ and $R^6$ represent individually hydrogen or hydrocarbon residue of a vinyl polymerization initiator an m represents an integer between 5–100) is reacted with an acid anhydride represented by the general formula: $(R^7CO)_2$ (where $R^7$ represents an alkyl group having 1–4 carbon atoms under the presence of a compound as the stepping agent represented by the general fromula $R^3R^4SiY_2$ (where $R^3$ and $R^4$ represent individually hydrocarbon or fluorine-substituted hydrocarbon groups, which may be identical or different with each other, and Y represents an acyloxy group having 2–5 carbon atoms, an alkoxy group having 1–4 carbon atoms or a thioalkoxy group having 1–4 carbon atoms).

21. The process as defined in claim 20, wherein $R^1$ has 1–10 carbon atoms; $R^3$ and $R^4$ individually have 1–10 carbon atoms; and the residue of the vinyl polymerization initiator has 2–18 carbon atoms.

22. The process as defined in claim 21, wherein $R^1$ represents an alkyl or fluorine-substituted alkyl group having 1–4 carbon atoms or phenyl group, and $R^3$ and $R^4$ represent individually alkyl or fluorine substituted alkyl groups having 1–4 carbon atoms or phenyl group.

23. The process as defined in claim 22, wherein $R^1$ represents a methyl, trifluoropropyl or phenyl group, $R^3$ and $R^4$ represent individually methyl or phenyl groups, and Y represents an ethoxy group.

24. The process as defined in claim 20, wherein $R^7$ represents a methyl group.

25. The process as defined in claim 20, wherein the reaction is carried out at a temperature between 30°–170° C., preferably, 50°–130° C. and, more preferably, 50°–90° C. at a reduced pressure between 50–200 mmHg.

26. The process as defined in claim 20, wherein Y represents the acyloxy group, and the reaction is carried out with the acid anhydride at 1–3 molar times and, preferably, 1.2–2 molar times of Si in the vinyl polymer.

27. The process as defined in claim 20, wherein Y represents an alkoxy or thioalkoxy group and the reaction is carried out with the amount of acid anhydride being 1–3 molar times and, preferably, 1.2–2 molar times of Si of the vinyl polymer and the stepping agent.

28. The process as defined in claim 20, wherein water is added, after the completion of the reaction, for carrying out the hydrolysis or hydrolytic condensation and hydrolysis.

29. The process as defined in claim 28, wherein the hydrolysis or the hydrolytic condensation and hydrolysis with the addition of water is carried out at a reaction temperature between −5°–80° C. and, preferably, 20°–60° C.

30. The process as defined in claim 28, wherein the amount of water added is less than the equimolar amount based on Si of the vinyl polymer.

31. The process as defined in claim 28, wherein after the reaction of the hydrolytic condensation, the resultant reaction solution is heated to a temperature between 50°–150° C. and, preferably, 70°–120° C. for 0.5–5 hours.

32. The process as defined in claim 28, wherein after the hydrolysis or the hydrolytic condensation and the hydrolysis, hexaalkylsilazane represented by the general formula $R^8_3Si-NH-Si-R^8_3$ (where $R^8$ represents an alkyl having 1–10 carbon atoms) or a trialkyl acyloxysilane represented by the general formula $R^8_3Si-OCOR^9$ (where $R^8$ has the same meanings as above and $R^9$ represents an alkyl group having 1–4 carbon atoms) is added to the resultant polymer for reaction.

* * * * *